(12) United States Patent
Warfen et al.

(10) Patent No.: US 8,405,237 B2
(45) Date of Patent: Mar. 26, 2013

(54) ENERGY SUPPLY FOR A BLADE ADJUSTMENT DEVICE PERTAINING TO A WIND ENERGY INSTALLATION

(75) Inventors: Karsten Warfen, Söhren (DE); Heinz-Hermann Letas, Süsel (DE)

(73) Assignee: REpower Systems AG, Hamburg (DE)

( * ) Notice: Subject to any disclaimer, the term of this patent is extended or adjusted under 35 U.S.C. 154(b) by 834 days.

(21) Appl. No.: 12/280,529

(22) PCT Filed: Feb. 23, 2007

(86) PCT No.: PCT/EP2007/001594
§ 371 (c)(1),
(2), (4) Date: Aug. 22, 2008

(87) PCT Pub. No.: WO2007/098894
PCT Pub. Date: Sep. 7, 2007

(65) Prior Publication Data
US 2009/0001726 A1  Jan. 1, 2009

(30) Foreign Application Priority Data
Feb. 24, 2006 (DE) .......................... 10 2006 009 127

(51) Int. Cl.
F03D 9/00 (2006.01)
H02P 9/04 (2006.01)
B64C 11/00 (2006.01)

(52) U.S. Cl. .................................. 290/44; 290/55; 416/1
(58) Field of Classification Search .................... 290/44, 290/55; 416/1
See application file for complete search history.

(56) References Cited

U.S. PATENT DOCUMENTS

| | | | | |
|---|---|---|---|---|
| 2,646,131 A | * | 7/1953 | Mergen et al. | 416/151 |
| 2,924,281 A | * | 2/1960 | Mergen et al. | 416/43 |
| 4,160,170 A | * | 7/1979 | Harner et al. | 290/44 |
| 4,161,658 A | * | 7/1979 | Patrick | 290/44 |
| 4,168,439 A | * | 9/1979 | Palma | 290/44 |
| 4,189,648 A | * | 2/1980 | Harner | 290/44 |
| 5,477,123 A | * | 12/1995 | Allen et al. | 320/124 |
| 5,621,301 A | * | 4/1997 | Allen et al. | 320/124 |
| 7,185,591 B2 | * | 3/2007 | Kumar et al. | 105/35 |

(Continued)

FOREIGN PATENT DOCUMENTS
DE         103 35 575        3/2005
DE     10 2004 005 169     11/2005

(Continued)

OTHER PUBLICATIONS
International Search Report directed towards international patent application No. PCT/EP2007/001594; 2 pages.

*Primary Examiner* — Pedro J Cuevas
(74) *Attorney, Agent, or Firm* — Morrison & Foerster LLP (57) ABSTRACT

A wind energy installation includes a tower provided with rotor blades that are adjusted using a servomotor connected to a pitch circuit and an emergency circuit. During normal operation the rotor blades are actuated by the pitch circuit and during emergency operation are actuated by the emergency circuit. The emergency circuit has an electric energy store, a switching device, connection lines to the servomotor and a protection device which includes comprises a power flow detector module (60) designed for determining whether electric power flows into or from the servomotor and a discharge module designed to limit the voltage and/or current in the emergency circuit in the case of a power flow from the servomotor.

16 Claims, 4 Drawing Sheets

U.S. PATENT DOCUMENTS

| | | | |
|---|---|---|---|
| 7,325,498 B2* | 2/2008 | Kumar et al. | 105/35 |
| 7,355,294 B2* | 4/2008 | Teichmann | 290/44 |
| 7,566,981 B2* | 7/2009 | Kunkel et al. | 290/44 |
| 7,669,534 B2* | 3/2010 | Kumar et al. | 105/35 |
| 7,709,972 B2* | 5/2010 | Arinaga et al. | 290/55 |
| 7,717,673 B2* | 5/2010 | Menke | 416/1 |
| 7,745,948 B2* | 6/2010 | Kerber | 290/44 |
| 7,786,694 B2* | 8/2010 | Kneller | 318/800 |
| 8,070,446 B2* | 12/2011 | Potter et al. | 416/155 |
| 8,093,740 B2* | 1/2012 | Oohara et al. | 290/44 |
| 8,106,525 B2* | 1/2012 | Letas | 290/44 |
| 2005/0146305 A1* | 7/2005 | Kneller | 318/801 |
| 2007/0024227 A1* | 2/2007 | Kunkel et al. | 318/479 |
| 2007/0267872 A1* | 11/2007 | Menke | 290/44 |
| 2007/0267873 A1* | 11/2007 | Teichmann | 290/44 |
| 2008/0290664 A1* | 11/2008 | Kruger | 290/55 |
| 2009/0058086 A1* | 3/2009 | Arinaga et al. | 290/44 |
| 2009/0066089 A1* | 3/2009 | Arinaga et al. | 290/55 |
| 2009/0243296 A1* | 10/2009 | Letas | 290/44 |
| 2010/0148506 A1* | 6/2010 | Letas | 290/44 |
| 2011/0037263 A1* | 2/2011 | Warfen et al. | 290/44 |
| 2011/0046802 A1* | 2/2011 | Jones et al. | 700/287 |
| 2011/0127935 A1* | 6/2011 | Gao | 318/400.3 |
| 2012/0032442 A1* | 2/2012 | Wibben | 290/44 |
| 2012/0169051 A1* | 7/2012 | Becker et al. | 290/44 |

FOREIGN PATENT DOCUMENTS

FR     2 790 882     9/2000

* cited by examiner

ENERGY SUPPLY FOR A BLADE ADJUSTMENT DEVICE PERTAINING TO A WIND ENERGY INSTALLATION

REFERENCE TO RELATED APPLICATIONS

This application is a national stage application under 35 USC 371 of International Application No. PCT/EP2007/001594, filed Feb. 23, 2007, which claims the priority of German Patent Application No. 10 2006 009 127.2, filed Feb. 24, 2006, the contents of both of which prior applications are incorporated herein by reference.

FIELD OF THE INVENTION

The invention relates to an energy supply for blade adjustment devices pertaining to a wind energy installation in general, and in particular to a wind energy installation having a rotor with adjustable rotor blades, wherein a servomotor connected to a pitch circuit and an emergency circuit is provided for adjusting the rotor blades.

BACKGROUND OF THE INVENTION

Wind energy installations with pitch-adjustable rotor blades generally have, for reasons of operational reliability, an emergency drive device with an autarkic energy store, such as a rechargeable battery. This emergency drive device with its own energy store is used as a reserve for incidents, to be precise in particular if the main system for the pitch adjustment drive no longer operates on account of a defect or on account of a failure of the energy supply. The emergency drive device is provided in order to be able to reliably shut down the wind energy installation even under those conditions. DE-B-103 35 575 discloses a pitch adjustment drive having an emergency drive device. The pitch adjustment drive comprises a mains-operated converter driving a three-phase motor which adjusts the angle of incidence on its associated rotor blade or blades. Furthermore, a rechargeable battery as an independent energy source is provided as the emergency drive device. The rechargeable battery is connected to the converter such that, in the case of a defect, the rechargeable battery is connected to the intermediate circuit of the converter via a switch and thus makes available the energy required to actuate the motor. It has been shown, however, that when the emergency drive device is in operation, certain load states can occur in which the rotor blade to be adjusted drives the motor. The result is a shift state. The latter leads to electric energy being generated in the motor, which can result in feedback of power to the rechargeable battery. Since in this case large intensities of current can occur, there is a risk of high-current charging for the rechargeable battery. Additionally this produces short-term charging cycles which decrease the service life of the rechargeable battery. It increases wear of the rechargeable battery, and there is even a danger of premature failure.

SUMMARY OF THE INVENTION

The invention is based on the object of providing an energy supply for a blade adjustment means, which reduces the abovementioned disadvantages.

The object is achieved according to the invention by the features of the independent claims. Advantageous developments are subject of the dependent claims.

In a wind energy installation having a rotor with rotor blades, the angle of incidence on which can be changed using a pitch adjustment device, wherein a servomotor connected to a pitch circuit and an emergency circuit is provided for the adjustment of the rotor blades, the rotor blades during normal operation being actuated by means of the pitch circuit and during emergency operation being actuated by means of the emergency circuit, and the emergency circuit has an electric energy store, a switching device, connection lines to the servomotor and a protection device, the invention envisages that the protection device comprises a power flow detector module designed for determining whether electric power flows into or from the servomotor and also a discharge module designed to limit a voltage and/or current in the emergency circuit in the case of a power flow from the servomotor.

Especially when the rotor blades are adjusted quickly into wind-milling position, a shift state in the pitch adjustment drive can occur on account of aerodynamic forces. This is understood to mean that the rotor blade drives the pitch adjustment drive. In this case, the servomotor acts as a generator. In the emergency circuit, the direction of the power flow therefore reverses. If the servomotor acts as a generator, electric power correspondingly flows out of it. The invention achieves that, during such a generator-type operation of the servomotor, electric power generated does not flow into the electric energy store of the emergency circuit. This state of generating electric power by the generator is detected by means of the power flow detector module according to the invention and then electric power is dissipated from the emergency circuit by means of the discharge module which is also provided according to the invention. This can be done in the manner such that the voltage or, correspondingly, the current in the emergency circuit is reduced. This thus counteracts the danger of damage to the electric energy store by way of high-current charging on account of the power generated during generator-type operation. Furthermore, any possible increase in voltage in the emergency circuit is limited, so that no damaging values can be reached. The factors which are negative for the service life and capacity of the electric energy store, such as overvoltage and short charge cycles which are caused by the back-flowing power during generator-type operation in installations of the prior art, can be avoided owing to the invention. Premature aging or even failure of the electric energy store is thus counteracted.

Besides conserving the electric energy store, the invention also achieves an improvement in the operating behavior. It has been found that in conventional installations, the stability of the system characteristic can be adversely affected when shift states, and resulting generator-type operation, occur. Owing to detecting such a state according to the invention by determining the power flow, the power thus generated is dissipated via the discharge module rather than being guided into the electric energy store, which achieves an improvement in the system characteristic.

Another advantage of the invention is that said advantages relating to the conservation of the electric energy store and to the improvement of the system characteristic can be achieved with little outlay in terms of hardware.

The power flow can be determined simply by the protection device determining the voltage in the emergency circuit and limiting its increase during emergency operation. Here, the invention takes advantage of the basically simple connection that a generator-type operation of the servomotor increases its terminal voltage, and thus the voltage in the entire emergency circuit increases. As opposed to normal operation, where the voltage in the emergency circuit is at most as high as the rated voltage of the electric energy store of the emergency circuit, in the case of the emergency operation and power flow out of the servomotor, the voltage increases to above the rated voltage of the electric energy store. Such a voltage change can be detected by means of the power flow detector module and thus the power flow direction can be determined. It cooperates with the discharge module such that, in the case of a power flow out of the servomotor, the voltage in the emergency circuit is limited, to be precise preferably to a value which is acceptable for the electric energy store. The damaging high-current charge of the energy store, which otherwise results from the increase in voltage, can in this way be reliably avoided. Expediently, the protection device is configured such that, during emergency operation, the voltage in the emergency circuit is limited to a value which is slightly above the rated voltage of the electric energy store, to be precise preferably approximately 5 to 20% above the rated voltage.

It is not, however, absolutely necessary for the power limitation by way of the discharge module to take place only via the voltage. Alternatively, or additionally, provision may be made to limit the current flow in the emergency circuit. This is of particular advantage in a low-impedance electric energy store in which high-current charging can take place already in the case of slight or hardly measurable changes in voltage. Depending on the technology used for the electric energy store, it can also be expedient to use a combination of the parameters voltage and current for the power flow detector module, in particular as a signed product of voltage and power.

In order to dissipate the excessive electric power generated by the servomotor during shift operation, the discharge module expediently has a brake chopper with a brake resistor. A brake chopper is understood to mean a combination of a synchronized switch (chopper) with an ohmic resistor as energy converter (from electric into thermal energy). Changing the duty factor when controlling the synchronized switch can determine how much electric power is converted via the discharge module into thermal energy and is thus removed from the emergency circuit. A brake chopper of this type thus enables a sensitive change in the power flow in the emergency circuit with little complexity in terms of hardware.

Preferably, the brake chopper is designed as a brake chopper of a converter and, during emergency operation, is connected via a switching element to the emergency circuit. The invention here takes advantage of the fact that converters typically already have a brake chopper in order to be able to dissipate any excessive energy. By using this brake chopper, which is present in most cases in any case, as the brake resistor for the emergency circuit, hardly any additional hardware is, in this respect, necessary for realizing the invention. Often, the converter provided in the pitch circuit is designed such that it has an intermediate circuit. In such a case, the brake chopper can be advantageously connected to the intermediate circuit. However, provision may also be made for the brake chopper to be connected to an inverter or an H-bridge circuit. Even though the arrangement of the brake chopper on the converter represents the most common embodiment, the invention can also be used in designs in which the brake chopper is connected to the inverter of the converter or of a downstream H-bridge circuit for controlling a DC motor.

According to a particularly preferred aspect of the invention, the discharge module has a setpoint value change module for the intermediate circuit. Said module is designed for changing a setpoint value for the energy state of the intermediate circuit, to be precise in the case of emergency operation with actuation of the servomotor via the emergency circuit. In the case of a DC voltage intermediate circuit, the setpoint value is a voltage, and the threshold value change module is designed to specify a lower voltage value as the setpoint value during emergency operation. It is then expedient to lower the setpoint voltage of the intermediate circuit to a voltage approximately equal to the rated voltage of the electric energy store. A threshold value of about 5 to 20% above the rated voltage of the electric energy store is preferred. This achieves a quick reaction of the brake resistor, to be precise in particular in those cases where the chopper, which is present in any case, of the converter acts as brake resistor. (This applies accordingly to currents in a DC intermediate circuit.)

The discharge module expediently has a system isolation device which is designed to isolate the converter from its supply system. To this end, a separate disconnection contactor can be provided, or one which is already present. Although a separate contactor increases the complexity which is necessary, it offers the advantage of a higher redundancy and thus higher reliability.

Furthermore, provision may be made for in each case one separate motor to be provided, rather than a common servomotor for the pitch circuit and the emergency circuit. Although this may necessitate a high complexity in terms of components, the redundancy of the entire pitch adjustment system increases. This is particularly expedient if only one common pitch adjustment system is provided for the rotor blades of the rotor. A separate motor for the emergency circuit then ensures even in the case of a defect of the motor, used during normal operation, of the pitch circuit that the rotor blades can be adjusted into the windmilling position. In unfavorable cases, the motor of the pitch circuit may be blocked on account of a defect. In order to be able to carry out an adjustment by means of the motor of the emergency circuit even in this case, the motor of the pitch circuit is expediently coupled to the rotor blade via a disengageable clutch and/or a shear connection. The clutch can be controlled, for example be designed as a magnetic clutch, and can thus be opened in the case of a defect of the motor of the pitch circuit; however, it may also be a friction clutch.

The motor of the pitch circuit is expediently a three-phase motor and that of the emergency circuit is a DC motor. The latter has the advantage of the simple supply of direct current from an electric energy store, such as a rechargeable battery. The three-phase motor for the pitch circuit offers the advantage of the higher torque, simpler design and good regulatability via the converter.

The invention further relates to a method for adjusting the rotor blades of a rotor for wind energy installations by means of a servomotor of a pitch adjustment device, wherein, during normal operation, the rotor blades are adjusted via a pitch circuit and, during emergency operation, the adjustment is carried out via an emergency circuit, wherein the invention further envisages determination of a power flow in the emergency circuit and limiting an electric power flowing from the servomotor during emergency operation by reducing the voltage and/or the current in the emergency circuit. For an explanation of the method, reference is made to the above description.

BRIEF DESCRIPTION OF THE DRAWINGS

The invention will be explained below with reference to the attached drawing in which advantageous exemplary embodiments are illustrated and in which.

DETAILED DESCRIPTION OF THE INVENTION

Figure 1:
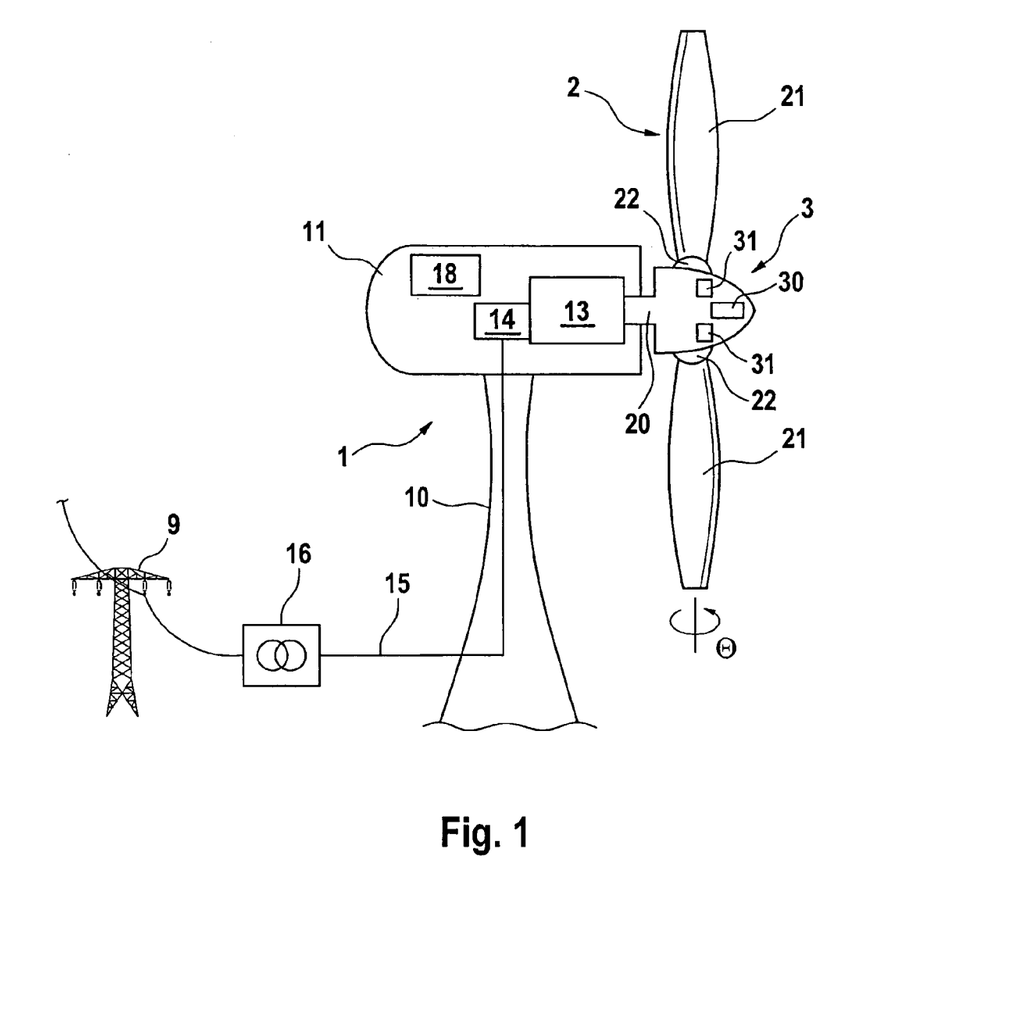
FIG. 1 shows a schematic view of a wind energy installation according to the invention.

A wind installation denoted as a whole by the reference numeral 1 comprises a tower 10 with a pod 11 which is arranged at its uppermost end in an azimuth plane such that it can move rotationally. On one front end of the pod 11, a rotor 2 is arranged rotatably via a rotor shaft 20. The rotor 2 comprises a plurality of (two in the illustrated example) rotor blades 21. A rotor blade hub 22 connects the propeller blades 21 to the rotor shaft 20. The rotor shaft 20 drives a generator 14 arranged in the pod 11 in order to generate electric energy. The electric energy is guided to a converter 14 and output to an electric supply system 9 via a three-phase line (only one phase is illustrated) 15 and a transformer 16. Furthermore, a control device 18 for the wind energy installation 1 is also arranged in the pod 11. Said control device serves in a manner known per se for the operational control of the wind energy installation.

The rotor blades 21 are arranged on the hub 22 such that they can be adjusted with respect to the angle of incidence θ on them. A pitch adjustment device 3 is provided for this. The pitch adjustment device comprises a pitch controller 30 and in each case one drive unit 31 which is associated with the individual rotor blades 21.

Figure 2:
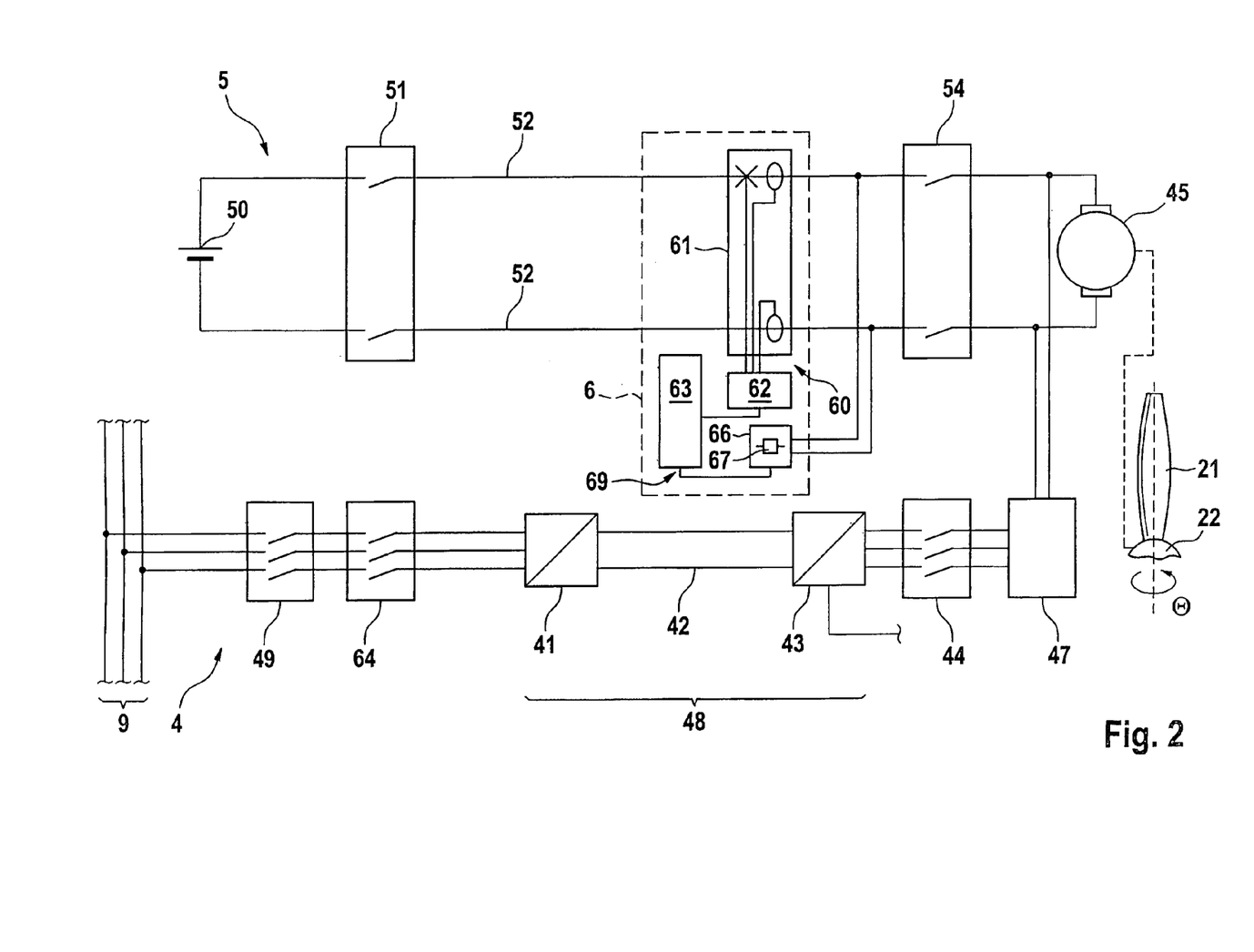
FIG. 2 shows a schematic view of a pitch adjustment means according to the invention with a pitch circuit and an emergency circuit.

The structure and mode of operation of the drive unit 31 will now be explained with reference to FIG. 2. It comprises a pitch circuit 4 and an emergency circuit 5 for operating a servomotor 45. The pitch circuit 4 is used to adjust the angle of incidence θ on the rotor blades 21 during normal operation. The emergency circuit 5 is used to ensure an adjustment of the rotor blades 21 into a reliable position (windmilling position) even if the pitch circuit 4 itself or its energy supply (to be precise from the electric supply system 9) has failed.

The pitch circuit 4 comprises a contactor 49, connected to the electric supply system 9, for the supply of energy and a converter 48 having a supply-system-side rectifier 41, an intermediate circuit 42 and an inverter 43. The inverter 43 generates a three-phase output signal which is applied to the servomotor 45. For this purpose, the servomotor 45, which is in the form of a DC motor, is connected to the inverter 43 via a motor contactor 44 and an H-bridge circuit 47. The H-bridge circuit 47 permits in a manner known per se the operation of a DC motor at the output of an inverter such that it can be regulated.

The emergency circuit 5 is used to furthermore enable an adjustment of the rotor blades 21 even if the pitch circuit 4 itself or its energy supply (illustrated by way of the electric supply system 9) fails. The emergency circuit 5 comprises a rechargeable battery 50 as electric energy store, a switching device 51 with connection lines 52 to the servomotor 55, which are connected via an emergency motor contactor 54. During emergency operation, the emergency circuit 5 acts in a manner such that electric energy flows from the rechargeable battery 50 into the connection line 52 via the switching device 51 and into the servomotor 45 via the emergency motor contactor 54, with the servomotor adjusting its associated rotor blade 21 into the reliable windmilling position. This mode of operation is referred to as "unregulated rechargeable-battery operation". The object of the present invention relates to this mode of operation. When adjusting the rotor blades 21, under certain conditions, in particular owing to aerodynamic forces, the situation may arise where the rotor blades 21 drive the servomotor 45. The result is a shift state. The servomotor 45 then generates electric energy which would conventionally be guided, via the connection line 52, into the rechargeable battery 50. There would consequently be a risk to the rechargeable battery 50 of high-current charging.

According to the invention, a protection device 6 is provided. It comprises, as main components, a power flow detector module 60 and a discharge module 69.

The power flow detector module 60 comprises a sensor unit 61 and an evaluation unit 62. The sensor unit 61 preferably has a measuring device for the voltage in the emergency circuit 4. In the case of the voltages which are usually present in the emergency circuit 5, and proceeding from a rated voltage of the rechargeable battery 50 of 288 Volt, the voltage can be measured galvanically by means of a conventional measuring device known per se. However, contactless measurement may also be envisaged. Alternatively or additionally, it is further possible to carry out a current measurement. For this purpose, a current measuring instrument known per se can be used, for example an embodiment operating on the basis of a clip-on ammeter or a Hall transmitter. Preferably, the current is measured with its sign. The measurement results of the sensor unit 61 are applied to the evaluation unit 62. The latter is designed to carry out a determination of the direction in which electric power flows in the emergency circuit 5 on the basis of the measurement values for the voltage and/or the current, based on the known rated voltage of the rechargeable battery 50. Typically it will be the case that, if the rotor blades are adjusted by means of the emergency circuit 5, electric power will flow into the servomotor 45. The result of a link with correct signs of the measurement values, which are supplied by the sensor unit 61, for the voltage and the current, is a positive value for the power, thus a direction of flow which points in the direction of the servomotor 45 according to convention. If no current measurement by means of the sensor unit 61 is envisaged, a measure for the voltage drop along the emergency circuit 5 with respect to the voltage on the rechargeable battery 50 can be ascertained via the measured voltage. In this manner, it is possible to determine the power flow by way of a pure voltage measurement with lower complexity in terms of measurement technology. If the voltage measured by the sensor unit 61 is below the terminal voltage on the rechargeable battery 50, the power flows to the servomotor 45; if it is higher, the power flows from the electric servomotor 45, that is to say the latter acts in the manner of a generator.

The discharge device 6 comprises a control device 63 and a brake chopper 66 and a brake resistor 67. The brake chopper 66 is connected to the electric servomotor 45 via the connection lines 52. The signal ascertained by the control unit 62 of the power flow module is applied, as the input signal, to the control device 63 by way of the direction of the power flow, and furthermore, if appropriate, a signal input (not illustrated) for control signals from a superordinate operating controller 18 is provided. The brake chopper 66 is connected to an output of the control device 63.

This embodiment illustrated in FIG. 2 operates as follows: during normal operation, the contactors 49 and 44 are closed and the contactors 51, 54 are open. The rotor blades 12 are now adjusted only via the pitch circuit 4 using the servomotor 45. During emergency operation, the contactors 51 and 54 are closed and the contactors 49 and 44 are open. Then the servomotor 45 is supplied with electric energy from the rechargeable battery 50. The servomotor 45 adjusts the angle of incidence θ on its associated rotor blade 21. In order to avoid undesired interaction with the regular pitch circuit 4, said contactor 44 of the pitch circuit 4 is open. Expediently, the contactor 64 is likewise open in order to isolate the converter 48 of the pitch circuit 4 from the supply system 9. During emergency operation, the power flow detector module 60 determines the direction in which the electric power flows via the connection lines 52 of the emergency circuit 5. If it flows from the electric servomotor 45, this means that the servomotor 45 acts in the manner of a generator. The control unit 62 of the power detector module 60 in this case transmits a control signal to the control device 63 of the discharge module 69. The control device 63 activates the brake chopper 66, which virtually short-circuits the connection lines via the brake resistor 67. In this manner the electric energy fed by the servomotor 45, which acts in the manner of a generator, into the connection lines 52 is dissipated into thermal energy. In this way, the rechargeable battery 50 is protected from an undesired high-current charging by the electric power generated by the servomotor 45 which acts in the manner of a generator. Furthermore, an undesired voltage increase in the emergency circuit 5 is limited. The control device 63 is expediently designed such that it limits the voltage to a value of at most approximately 10% above the rated voltage of the rechargeable battery 50.

Figure 3:
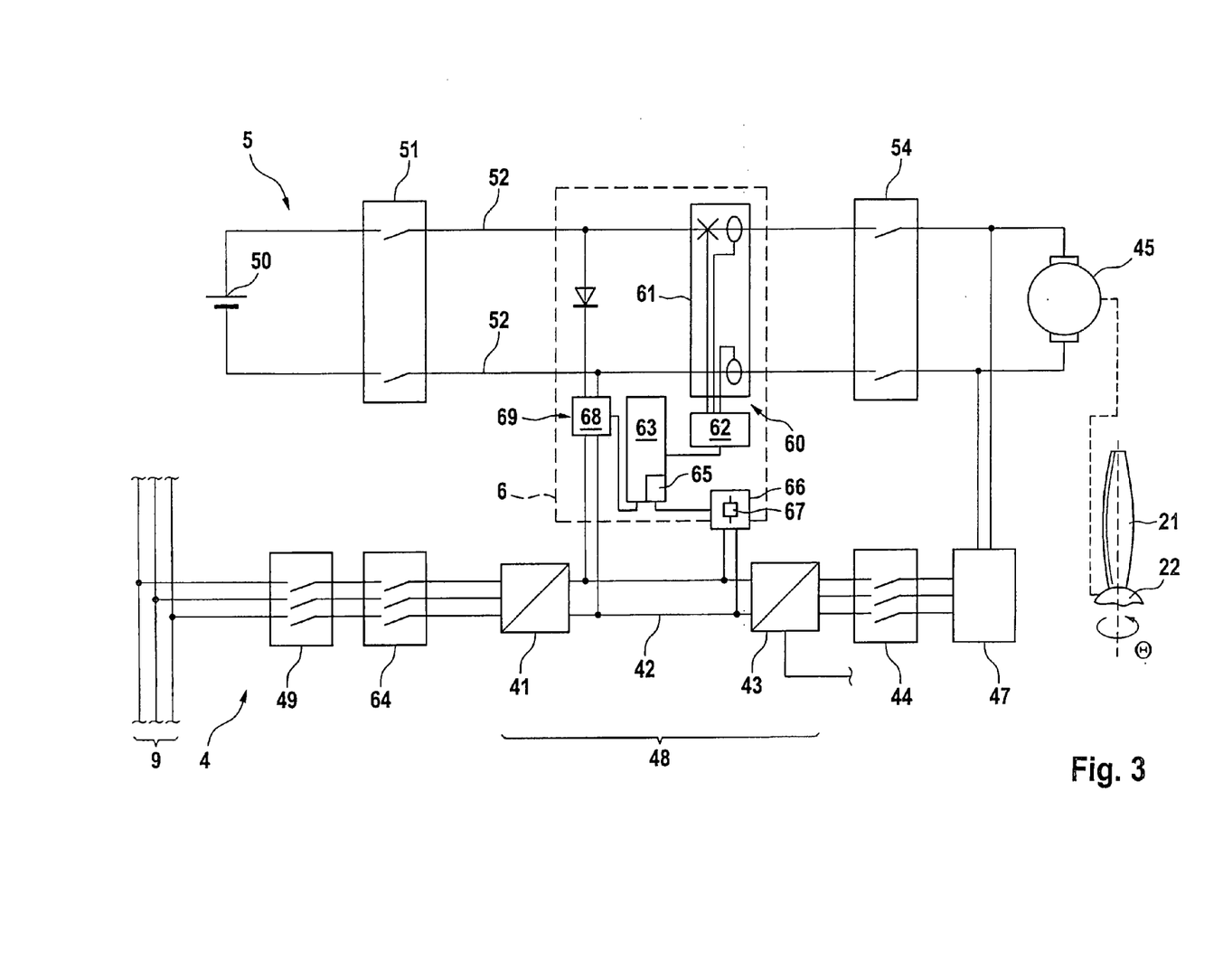
FIG. 3 shows a schematic view of an alternative embodiment to FIG. 2.

In FIG. 3, a second embodiment is illustrated, in which the brake chopper 66 is connected to the intermediate circuit 42 of the converter 48 of the pitch circuit 4. The control device 63 of the discharge module 69 also has a setpoint change module 65. It is designed for lowering the setpoint voltage of the intermediate circuit 42, starting from a relatively high voltage level during normal operation of approximately 800 Volt, to a lower voltage level during emergency operation, which is typically approximately 5 to 20% above the rated voltage of the rechargeable battery 50, preferably approximately 10%. In the exemplary embodiment illustrated, this is, at a rated voltage of the rechargeable battery 50 of 288 Volt, a reduced setpoint voltage of approximately 320 Volt.

The discharge module 6 furthermore comprises in this embodiment a switching element 68. It is designed as a bipolar contactor which connects the two connection lines 52 of the emergency circuit 5 to the corresponding lines of the DC voltage intermediate circuit 42 of the pitch circuit 4. The switching element 68 has a switch input which is actuated by the control device 63. Furthermore, a system isolation device 64 in the form of an additional contactor is provided as an additional safeguard for the converter 48 no longer being connected to the supply system 9 during emergency operation. The system isolation device 64 serves to ensure that, during emergency operation, electric power only flows via the discharge device 6 into the intermediate circuit 42.

The invention operates as follows: normal operation takes place as in the embodiment in FIG. 2. During emergency operation, the contactors 51 and 54 are closed and the contactors 49, 64 and 44 are open. In this way, the servomotor 45 is supplied with electric energy from the rechargeable battery 50. The servomotor 45 adjusts the angle of incidence θ on its associated rotor blade 21. In order to avoid undesired interaction with the regular pitch circuit 4, said contactor 44 of the pitch circuit 4 is open. The contactor 64 is open in order to isolate the converter 48 of the pitch drive 4 from the supply system 9. During this type of operation, the switching element 68 is on. This means that the connection lines 52 of the emergency circuit 5 are connected to the DC voltage intermediate circuit 42. The switching shaft of the brake chopper 66 is set by the control device 63 from its normal value of about 800 Volt to a value of 320 Volt, that is about 10% above the rated voltage of the rechargeable battery 50 of 288 Volt. If then a shift state occurs at the rotor blade 21 on account of aerodynamic forces in the manner that the servomotor 45 generates electric energy and feeds via the contactor 54 into the emergency circuit 5, said energy is guided via the discharge device 6 into the DC voltage intermediate circuit 42. The voltage in the DC voltage intermediate circuit 42 thus increases further until it reaches the value of the switching shaft of the brake chopper 66. The switching shaft is lowered to a value of about 10% above the rated voltage of the rechargeable battery 50 by the setpoint change module 65 of the control device 63. Any further increase in the voltage in the intermediate circuit 42 is limited by the brake chopper 66 by removing electric energy from the DC voltage intermediate circuit 42 and converting it into thermal energy by way of the brake resistor 67. Owing to the dissipation of electric energy generated by the servomotor 45 in the shift state into the DC intermediate circuit 42 with subsequent elimination by the brake chopper 66, the rechargeable battery 50 is protected against high-current charging.

Figure 4:
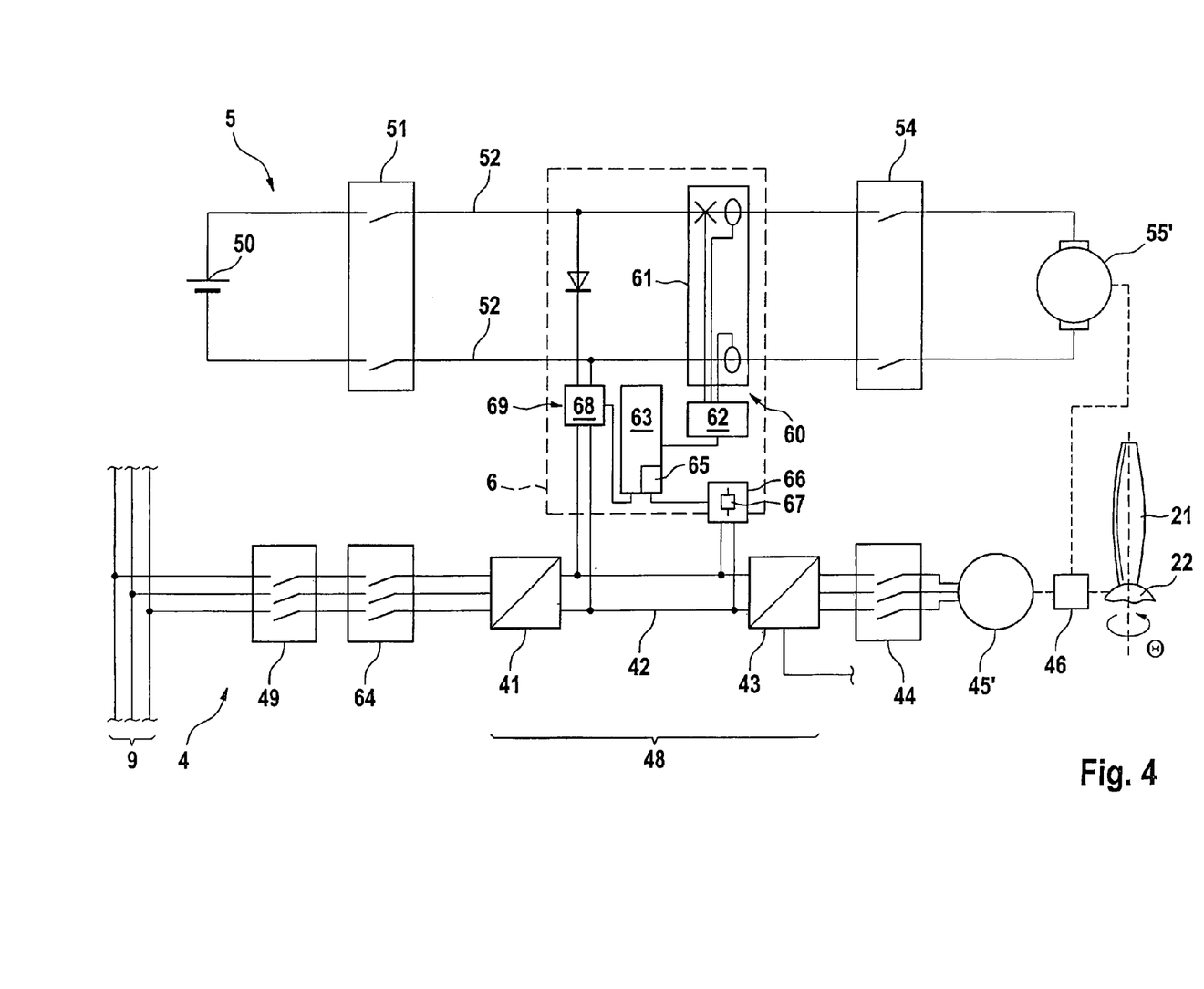
FIG. 4 shows a schematic view of another alternative embodiment.

The alternative embodiment illustrated in FIG. 4 differs from that illustrated in FIG. 3 and explained above basically in that the pitch circuit 4 and the emergency circuit 5 in each case have their own motor 45', 55, instead of the common servomotor. Furthermore, corresponding elements have the same reference numerals as in the embodiment in FIG. 2. The motor 45, of the pitch circuit 4 is in the form of a three phase synchronous motor and is controlled in a manner known per se by the converter 48. The motor 55, of the emergency circuit 5 is, just as in the embodiment in FIG. 2, a DC motor in order to enable simple supplying from the rechargeable battery 50. The motors 45', 55', in each case act on the rotor blade 21 (symbolized by the dashed line in FIG. 3). The motor 45' of the pitch circuit 4, however, does not act directly on the rotor blade 21, but via a magnetic clutch 46. The latter is designed to open in the case of emergency operation by means of the emergency circuit 5 and to interrupt the flow of force in this manner between motor 45' and the rotor blade 21.

The invention claimed is:

1. A wind energy installation, comprising:
    a rotor with rotor blades, the angle of incidence on which can be changed using a pitch adjustment device, and
    a servomotor connected to a pitch circuit and an emergency circuit,
    the rotor blades during normal operation being actuated by the pitch circuit and during emergency operation being actuated by the emergency circuit, and the emergency circuit comprising an electric energy store, a switching device, connection lines to the servomotor and a protection device,
    wherein the protection device comprises a power flow detector module configured to determine that electric power flowing from the electric energy store into the servomotor reverses direction and a discharge module configured to limit a voltage or a current response to the determination that the power flow from electric energy store into the servomotor reversed direction.

2. The wind energy installation of claim 1, wherein the power flow detector module is configured to determine the voltage in the emergency circuit and the discharge module is configured to limit the voltage in the case of power flow from the servomotor.

3. The wind energy installation of claim 2, wherein the discharge module comprises a setpoint value change module configured so that, during emergency operation, the voltage in the emergency circuit is set to a value which is above the rated voltage of the electric energy store.

4. The wind energy installation of claim 3, wherein the voltage in the emergency circuit is set to a value which is at least approximately 5% above the rated voltage of the electric energy store.

5. The wind energy installation of claim 3, wherein the voltage in the emergency circuit is set to a value which is at most approximately 20% above the rated voltage of the electric energy store.

6. The wind energy installation of claim 1, wherein the power flow detector module is configured to determine the current in the emergency circuit, and the discharge module redirects the current in the case of a power flow from the servomotor.

7. The wind energy installation of claim 1, 2 or 3, wherein the discharge module comprises at least one brake chopper with at least one brake resistor.

8. The wind energy installation of claim 7, wherein the brake chopper is part of a converter and, during emergency operation, is connected via a switching element to the emergency circuit.

9. The wind energy installation of claim 8, wherein the brake chopper is connected to an intermediate circuit of the converter.

10. The wind energy installation of claim 8, wherein the brake chopper is connected to an inverter or an H-bridge circuit of the converter.

11. The wind energy installation of claim 7, wherein the discharge module further comprises a system isolation device which isolates the converter from its supply system.

12. The wind energy installation of claim 1, 2 or 3, wherein the servomotor is of a redundant design with a motor of the pitch circuit and a motor of the emergency circuit.

13. The wind energy installation of claim 12, wherein the motor of the pitch circuit is a three-phase motor and the motor of the emergency circuit is a DC motor.

14. The wind energy installation of claim 12, wherein at least the motor of the pitch circuit is connected to the rotor blade via a disengageable clutch or a shear connection.

15. A method for adjusting rotor blades of a rotor in a wind energy installation by a servomotor of a pitch adjustment device, comprising
    determining that a direction of a power flow in an emergency circuit changed in the wind energy installation,
    determining that an emergency condition exists in the wind energy installation,
    limiting electric power flowing from the servomotor during the emergency condition by limiting the voltage or the current in the emergency circuit in response to the determination that the direction of the power flow changed, and
    changing the angle of incidence of the rotor blades using the pitch adjustment device,
    wherein, during a normal condition, the adjustment is carried out via a pitch circuit and, during the emergency condition, the adjustment is carried out via an emergency circuit.

16. The method of claim 15, wherein:
the servomotor is connected to a pitch circuit and an emergency circuit,
the rotor blades during normal operation are actuated by the pitch circuit and during emergency operation are actuated by the emergency circuit, the emergency circuit comprising an electric energy store, a switching device, connection lines to the servomotor and a protection device and
the protection device comprises a power flow detector module configured to determine whether electric power flows into or from the servomotor and a discharge module configured to limit a voltage or a current in the emergency circuit in the case of a power flow from the servomotor.

* * * * *